May 25, 1965  J. SCARR, JR  3,185,794
DUAL MERCURY SWITCH HAVING COMMON CONDUCTOR AND SPIRAL
BIMETAL ACTUATION
Original Filed July 31, 1959  3 Sheets-Sheet 1

INVENTOR.
JOHN SCARR JR.
BY
ATTORNEY

May 25, 1965     J. SCARR, JR     3,185,794
DUAL MERCURY SWITCH HAVING COMMON CONDUCTOR AND SPIRAL
BIMETAL ACTUATION
Original Filed July 31, 1959     3 Sheets-Sheet 2

INVENTOR.
JOHN SCARR JR.
BY
ATTORNEY

INVENTOR.
JOHN SCARR JR.
BY
ATTORNEY

United States Patent Office 3,185,794
Patented May 25, 1965

3,185,794
DUAL MERCURY SWITCH HAVING COMMON CONDUCTOR AND SPIRAL BIMETAL ACTUATION
John Scarr, Jr., Penn Hills Township, Allegheny County, Pa., assignor to Gulf Research & Development Company, Pittsburgh, Pa., a corporation of Delaware
Original application July 31, 1959, Ser. No. 830,897, now Patent No. 3,047,273. Divided and this application Dec. 1, 1961, Ser. No. 156,410
8 Claims. (Cl. 200—138)

This application is a division of copending application Serial Number 830,897, filed July 31, 1959, now United States Patent 3,047,273.

The instant invention relates to an electrical control system having particular utility for use with an automatic air conditioning apparatus, and more particularly pertains to a thermostatic electric control system for automatically controlling air conditioning apparatus of the type supplying heated air to an air conditioned space whenever the temperature therein falls below a predetermined value and supplying cool air to such air conditioned space whenever the temperature therein is above a higher predetermined value. More specifically, the apparatus of the invention involves an electrical control system for operating, in accordance with the previously mentioned temperature levels, a combined heating and cooling unit of the type that serves its heating function upon a high level of burner output and which serves its cooling function upon a low level of burner output by the application of absorption-type refrigeration principles. Such combined heating and cooling units are in themselves well known in the art, as exemplified by the commercially available Servel air conditioning equipment bearing model designations XFC-96-G and FCA-96-G shown and described in detail in a brochure published by Servel, Inc. Other concerns manufacture functionally similar units.

The electrical control system includes a pair of mercury switches, each of such switches being a single-pole, double-throw switch. The mercury switches are provided with a common temperature responsive actuator, which rotates said switches in response to changes in temperature, said mercury switches being angularly inclined with respect to each other relative to their axis of temperature controlled rotation, the arrangement being such that throughout a particular range of rotation of the switches such switches are closed at their opposite ends while angular displacement of the mercury switches either above or below this particular range of rotation results in the adjacent ends of the mercury switches being closed. One pair of adjacent ends of the switches is associated with electrical circuitry for operating the system for a heating cycle while the other pair of adjacent ends of the mercury switches is associated with electrical circuitry for causing a cooling cycle. The mercury switches are associated in such a manner that when they occupy a position within the range of angles in which opposite ends of the switches are closed, the system is inactive insofar as either heating or cooling is concerned.

Means is provided for angularly adjusting the mercury switches with respect to each other so that the temperature range in which the system is to be inactive insofar as as heating or cooling is concerned can be adjusted. Also, means is provided allowing adjustment of such temperature range upwardly or downwardly as desired without disturbing the extent of the temperature range itself.

The present invention has applicability to automatically controlling the operation of combined heating and cooling units of the type specified when the latter are gas fired (as are the above-noted Servel models); however, the invention is particularly concerned with automatically controlling the operation of such units when the latter are adapted to be oil fired, such as by commercially available oil burner units (such as the well known Heil burner) provided with an adjustable fuel oil metering device such as the Sundstrand Model AT air-oil fuel unit. Extension of the application of the principles of the invention to oil-fired as well as gas-fired units makes possible enjoyment of year-round air conditioning in areas where mains for natural or artificial gas are nonexistent. It will be evident to those skilled in the art that the principles of the invention will be applicable to the use of LPG fuels in the same manner as to gas-fired units, such fuels of course being available in areas where gas mains are nonexistent; however, this fact does not reduce the importance of being able to use oil as fuel considering the difference in expense involved in providing storage for LPG fuels and fuel oil and also the price differentials existing between such fuels.

Broadly, in relation to oil-fired units, the invention involves electrical means for selectively metering oil to an oil burner at either a high or a low rate with corresponding adjustment of the rate at which air is supplied to the burner, and also for shutting off the supply of fuel oil and air to the burner entirely; such selective means being electrically controlled by an electrical system that includes temperature responsive switches and associated circuitry such that within a predetermined temperature range the supply of air and fuel to the burner is cut off and with the air and fuel being supplied at the high and low rates to the burner when the temperature is below and above such range of temperature, respectively.

The selective operation of the rate of supply of fuel oil and air to the burner is accomplished by deenergizing the source of oil and air when it is desired that the supply of oil and air be cut off; and employing a solenoid actuated mechanical linkage to jointly control the metering of fuel oil and an air control shutter to achieve either the high or low level of burner outputs when the oil and air sources are energized. Means is provided for energizing a pump for circulating a cooling fluid through a condenser or heat exchanger conventionally associated with the absorption refrigeration system whenever the burner system is selectively operated for low burner output, and additionally means is provided for circulating or blowing cooled air into the air conditioned space concurrently with the operation of the pump for circulating the fluid coolant through the condenser.

The invention will be best appreciated upon reference to the accompanying drawings illustrative of a preferred embodiment thereof applied to the automatic operation of a heating and cooling unit of the Servel type modified for oil firing, wherein.

Figure 1:
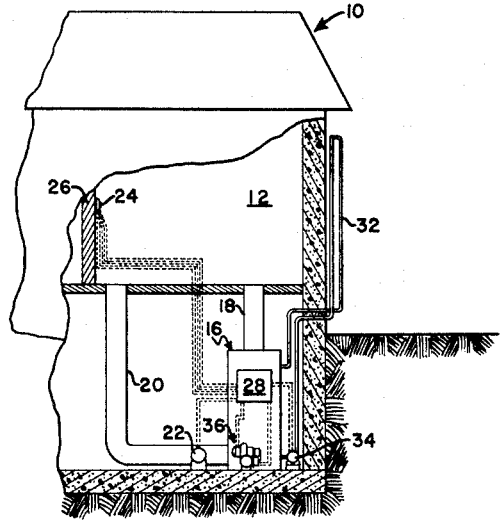
FIGURE 1 is a diagrammatic illustration of one application of the invention showing the same applied for air conditioning a room in a dwelling.

Referring to FIGURE 1, the reference numeral 10 designates a domestic dwelling generally that is shown partially in section to expose a portion of an upstairs room 12 that is air conditioned by the apparatus hereinafter described, and a portion of a basement 14 in which the bulk of the air conditioning equipment is disposed. The reference numeral 16 designates generally a Servel Model FCA-96-G air conditioning (combined heating and cooling) unit disposed in the basement 14, such unit 16 being of the type that heats air whenever supplied heat at a rate exceeding a predetermined value, but which will cool air upon being supplied heat at a predetermined lower value. An air duct 18 communicates between the unit 16 and the interior of the room 12 for supplying air from the unit 16 to the room 12 that is either heated or cooled by the unit 16 as the case may be. A return air duct 20 communicates between the interior of the room 12 and the bottom of the unit 16. It will be appreciated that the unit 16, the duct 18, the room 12, and the duct 20 constitute a closed air circuit. Under the control of the system presently to be described, an air blower actuated by an electric motor 22 is provided in the duct 20 for forcing movement of air through such circuit, which circulated air may be either unaffected, heated or cooled during its passage through the unit 16.

A thermostat 24 described more fully hereinafter is placed on a wall 26 of the room 12, such thermostat 24 being connected to a master conditioner control panel 28.

The unit 16 is provided with a fluid coolant circulatory system that includes a condenser 32 positioned outside the dwelling 10, with the piping associated with the condenser 32 including a portion disposed within the basement 14 that is provided with a circulating pump that is actuated by an electric motor 34, it being understood that when the motor 34 is energized, the cooling medium will be circulated from the unit 16 through the condenser 32 and back to the unit 16, whereby heat can be removed from the refrigerating system of the unit 16.

Figure 3:
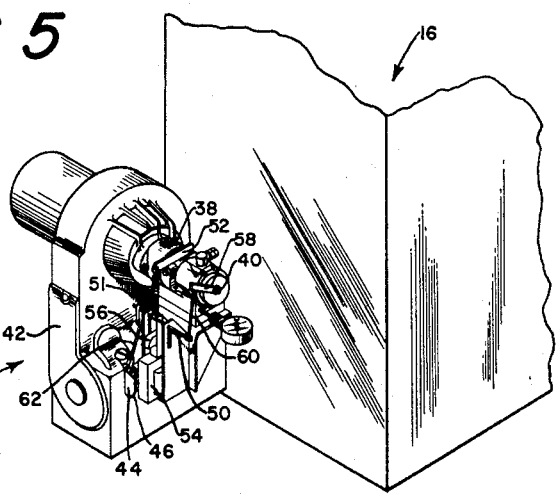
FIGURE 3 is a perspective view of the solenoid actuated control mechanism for controlling the rate of supply of oil and air to the burner.

A burner system is designated generally at 36 and the same is associated with the lower part of the unit 16 in lieu of the gas-fired unit customarily associated with the Servel Model No. FCA-96-G unit. Referring to FIGURE 3, the burner system 36 is shown in perspective as a part of the heating and cooling unit 16. The burner system 36 is a Heil burner that includes a Sundstrand-type oil pump 38. The pump 38 is conventional and includes a pumping rate meter control shaft 40. The burner system 36 also includes an air blower section 42, the air flow rate of which is controlled by a conventional gating valve 44 partially visible through an adjustment slot 46 in the housing of the air blower section 42. It will be understood that the oil metering pump 38 and the motor for the air blower section 42 of the burner system 36 are provided with a pair of common electrical supply leads 48 and 49 that connect between the master panel 28 and the burner 36 (see FIGURE 2), the arrangement being such that when the leads 48 and 49 are energized, the oil metering pump 38 and the blower of the air section 42 are both placed in operation. The rates at which the oil metering pump 38 and the blower section 42 supply oil and air for combustion are controlled by means of the angular position of the shaft 40 and the position occupied by the gating valve 44. As viewed in FIGURE 3, counterclockwise rotation of the shaft 40 results in a higher rate of oil supply with displacement of the gating valve 44 downwardly toward the right resulting in a corresponding increase in the rate of air supply through the blower section 42. With the shaft 40 and the gating valve 44 in the positions shown thereof in FIGURE 3, the rates of oil and air supply are balanced and are at rates such that a low level of heat output for the burner system 36 is realized. Such rate of low heat output for domestic purposes can conveniently be on the order of about one-half gallon of fuel oil per hour.

A common means is provided for actuating both the shaft 40 of the oil metering pump 38 and the gating valve 44 in such a manner that a substantially increased heat output for the burner system 36 is accomplished (say on the order of one gallon per hour oil consumption for domestic purposes) with the relative oil and air flow rates being appropriately balanced. Such common means for actuating the shaft 40 and the gating valve 44 comprises a horizontal bar 50 guided for vertical reciprocation, such bar 50 being resiliently biased to a raised position by a coiled tension spring 51 that extends between the bar 50 and a bracket 52 mounted on the oil metering pump 38. An electrical solenoid 54 is positioned below the bar 50 for actuating guided vertical movement of an armature 56 connected to the bar 50. The arrangement is such that the bar 50 normally occupies the position shown thereof in FIGURE 3, but is displaced to a lowered position against the action of the spring 51 upon energization of the solenoid 54. The shaft 40 of the oil metering pump 38 is provided with an actuating arm 58 that is connected by a link 60 to one end of the bar 50, the other end of the bar 50 being connected by a link 62 to the gating valve 44. It will therefore be seen that by virtue of the mechanical linkages between the bar 50 and the shaft 40 and between the bar 50 and the gating valve 44, the heat output of the burner system 36 is at a high level during energization of the burner system 36 through the leads 48 and 49 during the period of time that the solenoid 54 is energized, but that when the leads 48 and 49 are energized and the solenoid 54 is not energized, the heat output of the burner system 36 will be at a reduced level. It will be understood that such high and low heat outputs of the burner system 36 correspond to the unit 16 operating on heating and cooling cycles, respectively.

Figure 5:
FIGURE 5 illustrates diagrammatically the angular adjustment between the mercury switches through the use of the means shown in FIGURE 4.
Figure 4:
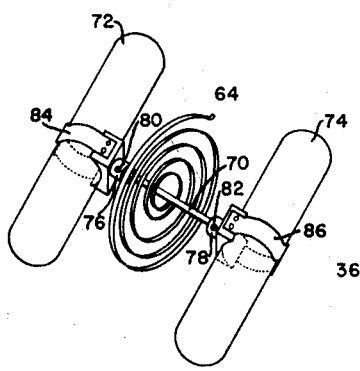
FIGURE 4 is a perspective view of the adjustable mounting means for the mercury switches and the temperature-sensitive actuating means therefor.

Attention is now directed to FIGURE 4 wherein the temperature controlled components of the thermostat 24 are shown. A temperature responsive bimetallic strip of spiral form is indicated at 64. As is conventional, the outer end of the bimetallic strip 64 can be adjusted angularly within the housing of the thermostat 24 by means of the control knob 66 (see FIGURE 2) to an extent determined by appropriate indicia 68 provided on the housing of the thermostat 24. The inner end of the bimetallic strip 64 is secured to a shaft 70. A pair of mercury switches 72 and 74 are mounted on the shaft 70 substantially transversely to the longitudinal axis of shaft 70. Angular adjustment between mercury switches 72 and 74 is effected by means of collars 76 and 78 fixed in adjusted relation to the shaft 70 by means of set screws 80 and 82 that extend through the collars 76 and 78, respectively. The collars 76 and 78 are respectively provided with spring clips 84 and 86 that resiliently hold the mercury switches 72 and 74. FIGURE 5 shows at 88 an angle which may be effected by adjustment of the collars 76 and 78 between the mercury switches 72 and 74.

Figure 6:
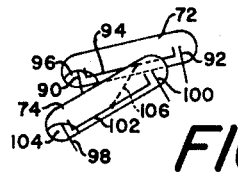
FIGURES 6 through 8 illustrate respectively the positions occupied by the mercury switches when the system is effective for heating, inactive, and effective for cooling when considered in relation to FIGURE 9.
Figure 7:
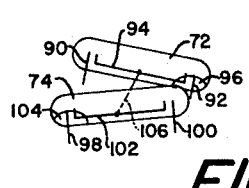
Figure 8:
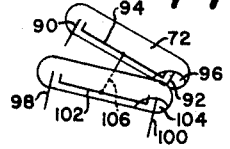

Attention is now directed to FIGURES 6 through 8, inclusive. It will be seen that the mercury switch 72 includes end terminals 90 and 92, and a central conductor 94 having its opposite ends adjacent the terminals 90 and 92. The mercury switch 72 contains a small quantity of mercury 96 which selectively shorts the conductor 94 to the terminals 90 and 92 in a manner dependent upon the horizontal inclination of the mercury switch 72. Such inclination is, of course, determined by the adjustment of the thermostat knob 66 relative to the indicia 68 (this turns the bimetallic strip 64 and the shaft 70 carried thereby as a unit), the adjustment of the collar 76 on the shaft 70, and the effect of temperature on the bimetallic strip 64. At temperatures below a minimum value $T_1$ (say 70° F.), the switch 72 is tilted counter-clockwise so that the mercury 96 electrically connects terminal 90 to the conductor 94 (see FIGURE 6), while at temperatures above $T_1$ (see FIGURES 7 and 8), the mercury 96 electrically connects terminal 92 to the conductor 94. Switch 74 is identical to switch 72 except for its angle of inclination in the vertical plane indicated at 88 in FIGURE 5. The switch 74 includes terminals 98 and 100, conductor 102, and mercury 104. At temperatures below $T_2$ ($T_2$ being higher than $T_1$, say 80° F.), the mercury 104 electrically connects the conductor 102 to the terminal 98 (see FIGURES 6 and 7), but at temperatures higher than $T_2$, the mercury 104 electrically connects the conductor 102 to the terminal 100 (see FIGURE 8). As shown diagrammatically in FIGURES 6 through 8, the conductors 94 and 102 of the switches 72 and 74 are electrically connected by a lead 106.

Figure 9:
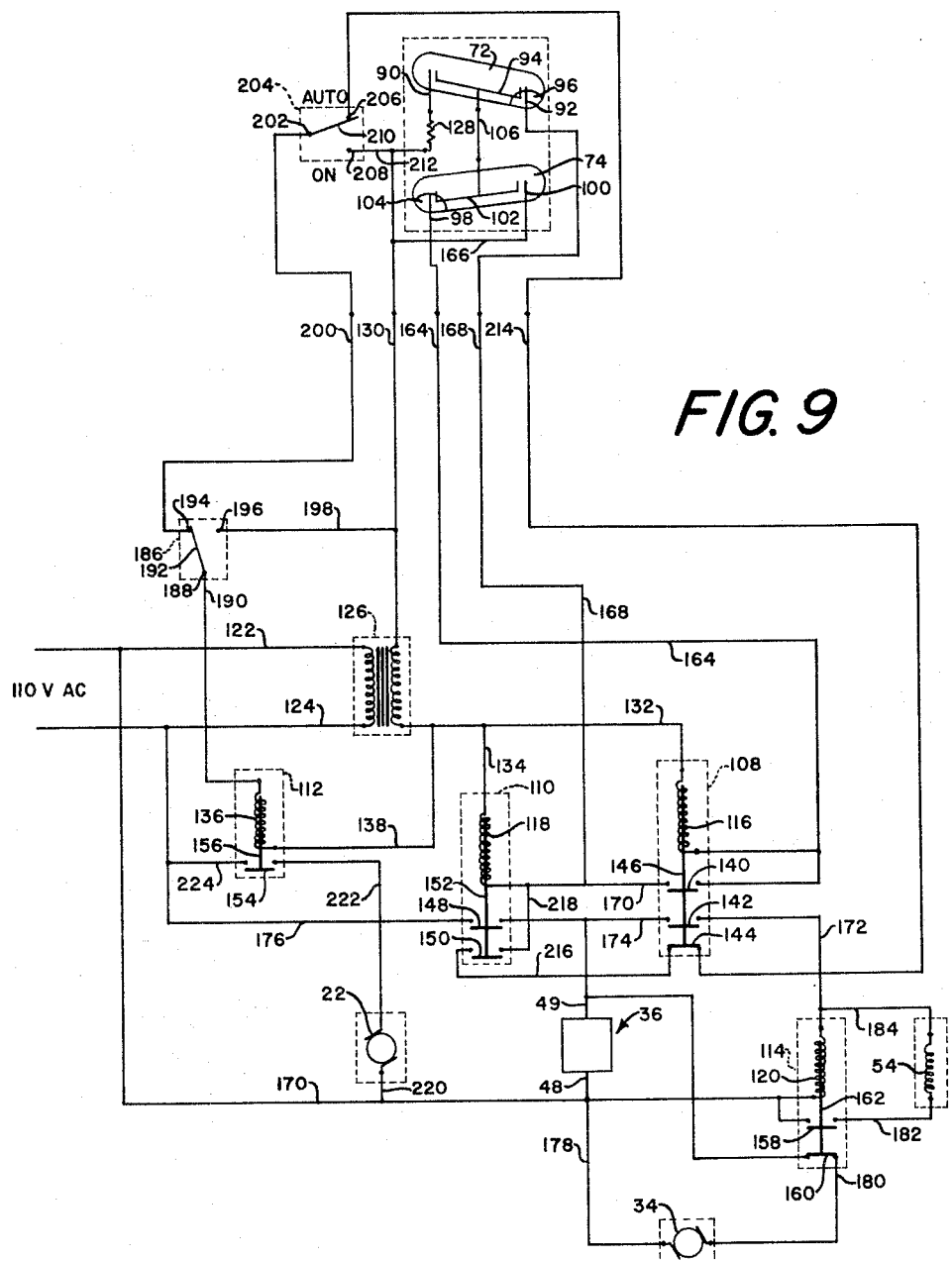
FIGURE 9 is a schematic wiring diagram of the entire electrical control system.

Attention is now directed to FIGURE 9 wherein the entire electrical system is schematically illustrated. The numerals 108, 110, 112, and 114 respectively designate a master control relay, a burner control relay, a blower control relay, and a relay for selectively controlling the output rate of the burner system 36 and the coolant circulating pump motor 34. In accordance with whether demand is for a heating or cooling cycle, actuation of the relays 108, 110, 112, and 114 is dependent upon the position of the mercury switches 72 and 74. Circuitry will now be described by means of which the solenoid 116 of relay 108 is energized solely when the switches 72 and 74 are in the position shown in FIGURE 6; the solenoid 118 of relay 110 is energized solely when the switches 72 and 74 are in either of the positions shown in FIGURES 6 and 8; and the solenoid 120 of relay 114 is energized solely when the switches 72 and 74 are in the position shown in FIGURE 8.

The relays 108, 110, 112, and 114 are included in the master panel 28 that is fixed to the unit 16 (see FIGURE 1). Domestic alternating current (110 v. A.C.) is supplied by leads 122 and 124 to the primary of a step-down transformer (24 v. A.C. output) 126. One terminal of the secondary of the transformer 126 is connected to the terminal 90 of switch 72 through a thermostat heater 128, disposed in the housing of the thermostat 24, by a lead 130, with the other terminal of the secondary of the transformer 126 being connected to solenoids 116 and 118 by leads 132 and 134. For a purpose to be explained later, the last-mentioned terminal of the secondary of the transformer 126 is connected to the solenoid 136 of the relay 112 by a lead 138.

FIGURE 9 shows the electrical system in the condition corresponding to the position of the switches 72 and 74 shown in FIGURE 7, in which case none of the relays 108, 110, 112, and 114 have their solenoids energized, and the armatures of such relays and the armature actuated contacts thereof are shown in corresponding positions. The relay 108 includes contacts 140 and 142 that are normally open and a contact 144 that is normally closed. The contacts 140, 142, and 144 are carried by an armature 146. The relay 110 includes normally open contacts 148 and 150 carried by an armature 152. The relay 112 includes a normally open contact 154 carried by an armature 156. The relay 114 includes a normally open contact 158 and a normally closed contact 160 carried by an armature 162.

The end of the solenoid 116 remote from the transformer 126 is connected to the terminal 98 of switch 74 by a lead 164. The previously mentioned transformer lead 130 is connected to the terminal 100 of switch 74 by a lead 166. It will therefore be apparent that solenoid 116 can only be energized upon the switches 72 and 74 both being in the FIGURE 6 position (temperature ambient to the thermostat 24 being less than $T_1$) by a circuit comprising lead 132, transformer 126, lead 130, resistor 128, terminal 90, mercury 96, conductor 94, lead 106, conductor 102, mercury 104, terminal 98, lead 164, and the solenoid 116.

The end of the solenoid 118 remote from the transformer 126 is connected to the terminal 92 of switch 72 by a lead 168, and also to the lead 164 by a lead 170 that can be closed by the relay contact 140. By virtue of the latter connection, it will be plain that the solenoid 118 is energized by the action of the contact 140 whenever the solenoid 116 is energized. Otherwise, the solenoid 118 can only be energized when the switches 72 and 74 are as shown in FIGURE 8 (temperature ambient to the thermostat 24 being in excess of $T_2$) by the circuit comprising lead 134, transformer 126, lead 130, lead 166, terminal 100, mercury 104, conductor 102, lead 106, conductor 94, mercury 96, terminal 92, lead 168, and the solenoid 118.

While relays 108, 110, and 112 are actuatable by 24 v. A.C., relay 114, and the solenoid 54 are actuatable by 110 v. A.C. The solenoid 120 of relay 114 is connected in series between power supply leads 122 and 124, by leads 170, 172, 174, and 176, with connection between leads 172 and 174 being made by contact 142 on actuation of relay 108, and with connection between leads 174 and 176 being made on actuation of relay 110. Therefore, relay 114 is actuated solely upon concurrent actuation of relays 108 and 110 which can only occur when the switches 72 and 74 are as shown in FIGURE 6 (temperature ambient to the thermostat 24 being less than $T_1$).

The burner system 36 is connected in series between the leads 170 and 174 by the leads 48 and 49 so that the burner 36 is electrically energized for ignition, supplying combustion air, oil, etc. solely when relay 110 is actuated, in other words, solely when the switches 72 and 74 are in the positions shown in FIGURES 6 and 8 (temperature ambient to the thermostat 24 being either above $T_2$ or less than $T_1$).

The pump motor 34 for circulating coolant through the condenser 32 is connected in parallel with the burner system 36 by leads 178 and 180; however, the leads 178 and 180 are connected by the contact 160 solely when the relay 114 is not actuated. Therefore the pump motor 34 is actuated solely when the switches 72 and 74 are as shown in FIGURE 8 (the temperature ambient to the thermostat 24 being above $T_2$).

The previously mentioned solenoid 54, associated with the burner system 36 for controlling the rate of fuel and air supply, and consequently the heater output rate, is connected in parallel with the solenoid 120 of the relay 114 by leads 182 and 184. The leads 182 and 184 are connected by the contact 158 solely when the relay 114 is actuated, and consequently the burner system 36 is changed from its normal low heat output adjusted position by action of the solenoid 54 to the high heat output adjusted position when the relay 114 is actuated (the temperature ambient to the thermostat 24 being below $T_1$).

Energization of the solenoid 136 of relay 112 is made dependent upon several factors, the first of which is a conventional temperature responsive single-pole, double-throw switch 186 associated with the unit 16 so as to sense the temperature of treated air therein. Such switches are commonly used with automatically controlled furnaces and serve with a snap action to throw the switch in one direction when the temperature of the furnace air exceeds a moderately high value in excess of desired room temperature, say about 110° F., with the switch being thrown in the other direction at all lower temperatures. The single pole 188 of the switch 186 is connected by a lead 190 to the end of the solenoid 136 opposite the transformer 126, and the movable contact 192 is shown in the latter position (low or cool air temperature in the unit 16) connecting between the pole 188 and stationary contact 194. At temperatures above a preselected minimum, the contact 192 connects between the pole 188 and a stationary terminal 196, in which latter case the solenoid 136 is energized by virtue of a lead 198 connected between the terminal 196 and the lead 130, thereby completing a circuit through the secondary of the transformer 126 comprised of lead 190, contact 192, terminal 196, lead 198, lead 130, transformer 126, lead 138, and solenoid 136.

Figure 2:
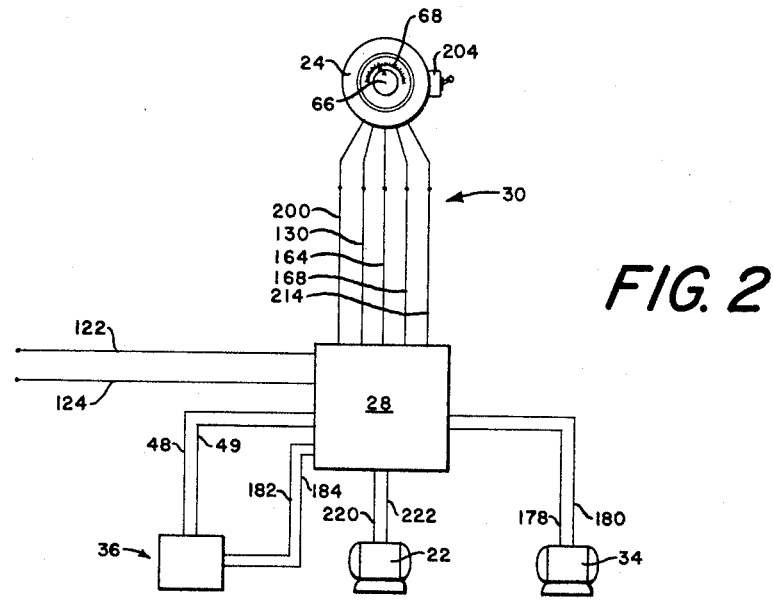
FIGURE 2 is a simplified diagrammatic illustration of the electrical components of the air conditioning system.

The terminal 194 of the switch 186 is connected by a lead 200 to the pole 202 of a manually operated single-pole, double-throw switch 204. The switch, as shown in FIGURE 2, is mounted on the housing of the thermostat 24, and the two fixed contacts 206 and 208 of the switch 204 are respectively labeled "auto" and "on." With the movable contact 210 of the switch 204 being in the "on" position, the solenoid 136 will be energized notwithstanding the position of the contact 192 of switch 186, as the terminal 208 of switch 204 is (like terminal 196 of switch 186) connected by a lead 212 to the lead 130.

With the contacts 192 and 210 of switches 186 and 204 positioned as shown in FIGURE 9, the solenoid 136 can only be energized by a circuit that includes a lead 214 (connected to terminal 206 of switch 204), leads 216, 218, and 168, terminal 92, mercury 96, conductor 94, lead 106, conductor 102, mercury 104, terminal 100, leads 166 and 130, transformer 126, lead 138, solenoid 136, lead 190, pole 188, contact 192, terminal 194, lead 200, pole 202, contact 210, and terminal 206. The latter circuit can only be cooled by contacts 144 and 150 when relay 108 is not actuated and relay 110 is actuated (this occurs solely when the temperature ambient to the thermostat 24 exceeds $T_2$ in which case the switches 72 and 74 are in the position shown in FIGURE 8). Therefore, the relay 112 is actuated solely when either:

(1) Temperature in the unit 16 exceeds a predetermined value, or (2) Temperature in the unit 16 is below said predetermined value and the contact 210 engages the terminal 208 labeled "on," or (3) Temperature in the unit 16 is below said predetermined value, the contact 210 engages the terminal 206 labeled "auto," and the temperature ambient to the thermostat 24 exceeds $T_2$.

The electric blower motor 22 for circulating air is connected between the power lead branches 170 and 176 by leads 220, 222, and 224, it being noted that the contact 154 serves to connect leads 222 and 224 solely during actuation of the relay 112. Therefore, conditioned air is circulated through the unit 16 to the room 12 only upon the occurrence of one of the three conditions numbered above.

Figure 10:
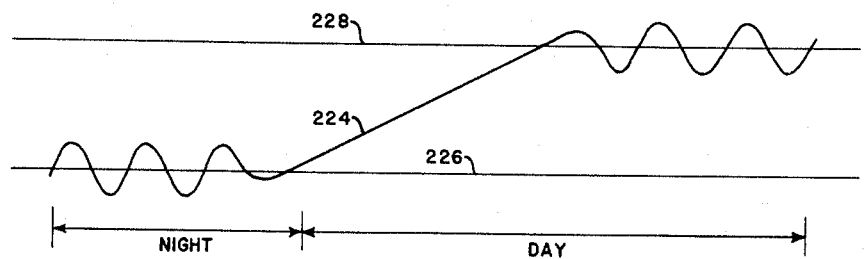
FIGURE 10 is an idealized graphical representation of the manner in which the temperature in the air conditioned space can vary as the control system operates from a condition necessitating intermittent heat supply followed by the necessity for intermittent cooling.

Attention is now directed to FIGURE 10 wherein there is shown an idealized graph of the manner in which the temperature in the room 12 will be maintained during the coolness of a night during which the temperature in the room 12 would drop substantially below $T_1$, and during an ensuing warm daytime period during which the temperature in the room 12 would otherwise rise substantially above the temperature $T_1$. It will be seen that the line 224 representing temperature oscillates above and below the line 226 representing a temperature of $T_1$ during the interval of time identified as "night," and thereafter increases to a general level wherein the same oscillates above and below the line 228 representing the temperature $T_2$ during the time interval designated as "day." During the period of time during which the line 224 oscillates above and below the line 226, the temperature outside the room 12 is such that intermittent periods of heating are required in order to maintain the room temperature about the level $T_1$. During the portions of temperature oscillation when the line 224 is below the line 226, it will be understood that the mercury switches 72 and 74 are in the positions shown thereof in FIGURE 6 such that the burner 36 has a high heat output so that the unit 16 is furnishing heat to the room 12. Inertial aspects of the heating system result in the temperature rising to levels somewhat above that indicated by the line 226. With external temperatures rising as upon the change of night into day, there is no further need for heating, and the room temperature enters a period during which the same gradually increases to be slightly above the temperature $T_2$ represented by the line 226, whereupon the mercury switches 72 and 74 assume the positions shown in FIGURE 8, with the result that the burner system 36 is operated at its low heating rate. During the course of the daytime period, cooling will be intermittently demanded so that the temperature in the room 12 will rise and fall so as to oscillate above and below the temperature level $T_2$ as represented by the line 228. It will be noted that whenever the temperature in the room 12 as sensed by the bimetallic strip 64 of the thermostat 24 lies between the temperatures $T_1$ and $T_2$, the mercury switches 72 and 74 are in the positions shown thereof in FIGURES 7 and 9, during which time the burner system 36 as well as the pump motor 34 is inactive. During such period, the blower motor 22 will be energized only if the air within the unit 16 is hot (immediately following a heating interval), or if the switch 204 is in the "on" position. Whenever the temperature sensed by the thermostat 24 is below $T_1$, the burner system 36 is activated at its high heating rate and the blower motor 22 is energized as soon as the air within the unit 16 has become heated; however, the pump motor 34 is deenergized whenever the temperature is below $T_1$ and for that matter below $T_2$. Whenever the temperature sensed by the thermostat 24 exceeds $T_2$, the burner system 36 is activated to its low output heating rate, and the blower motor 22 and the pump motor 34 are energized.

It has been previously mentioned that the principles of the instant invention are applicable to the use of gas and LPG fuels as well as to the burning of fuel oil. The foregoing description of a preferred embodiment of the invention as applied to the burning of fuel oil will make this apparent to those skilled in the art. Where it is desired to burn either natural or manufactured gas as provided in gas mains or LPG fuels, each of which are of course burned in a gaseous state, it is only necessary that the burner system 36 be such as to include a conventional gas combustion unit, rather than the described oil burner, with the air vents appropriately adjusted for the class of fuel that it burns. The leads 48 and 49 are in this modification applied to controlling a solenoid master shut-off valve in the fuel supply line, such that the shut-off valve is closed at all times except when the leads 48 and 49 are energized. Also, a solenoid fuel flow rate controlling valve down-stream of the shut-off valve would be actuatable between two positions by means of a mechanical linkage to the armature 56 controlled by the solenoid 54, the arrangement being such that energization of the leads 182 and 184 would cause the solenoid 54 to actuate the fuel flow controlling valve to a high flow rate position, with the valve returning to a low flow rate position upon deenergization of the solenoid 54.

Many other arrangements will readily occur to those skilled in the art. For example, two burners can be arranged in parallel with one of the burners arranged to operate solely when the leads 48 and 49 are energized, with the other burner arranged to operate solely when the leads 182 and 184 are energized. With this alternate arrangement, cooling will occur during single burner operation, and heating will occur during dual burner operation.

From the foregoing, it will be appreciated that the disclosed apparatus is capable of controlling a conventional heating and cooling unit in an entirely automatic fashion so that the unit is operated as a heater whenever the temperature is below one temperature and as a cooling unit whenever the temperature exceeds a somewhat higher temperature. Not only is the heating and cooling unit operated in such an automatic fashion, but auxiliary equipment such as the air circulation motor and the coolant circulating motor are operated in proper coordination therewith. The advantages of such a fully automated control system for year-round air conditioning purposes will be evident.

No further description of the apparatus is deemed necessary to a full and complete understanding of the principles involved. The apparatus has been described in rather elaborate detail in order to facilitate an understanding thereof, and restricted scope of invention is not to be imputed from such detailed description, but rather attention is directed to the appended claims in order to ascertain the actual scope of the invention.

I claim:

1. Control means including first and second mercury switches, rotatable means coupled to said mercury switches adapted to rotate said switches on a substantially horizontal axis, each of said switches having a central conductor and a first and a second contact at its opposite ends, means electrically connecting the central conductors of the switches, each of said first contacts being at the forward end of its respective switch in relation to switch rotation in one direction, each of said second contacts being at the forward end of its respective switch in relation to switch rotation in the opposite direction, said mercury switches being inclined with respect to each other in the vertical plane so that one of said switches is more forwardly inclined with regard to rotation in one direction while the other of said switches is more forwardly inclined with regard to rotation in the opposite direction.

2. Control means including first and second mercury switches, rotatable measuring means for measuring a variable coupled to said mercury switches and adapted to rotate said switches on a substantially horizontal axis in response to measured changes in said variable, said rotatable measuring means adapted to rotate said switches in one direction in response to a measured increase in said variable and to rotate said switches in the other direction in response to a measured decrease in said variable, each of said switches having a central conductor and a first and a second contact at its opposite ends, means electrically connecting the central conductors of the switches, each of said first contacts being at the forward end of its respective switch in relation to switch rotation in one direction, each of said second contacts being at the forward end of its respective switch in relation to switch rotation in the opposite direction, said mercury switches being inclined with respect to each other in the vertical plane so that one of said switches is more forwardly inclined in the direction corresponding to rotation in one direction while the other of said switches is more forwardly inclined in the direction corresponding to rotation in the opposite direction.

3. Temperature control means including first and second mercury switches, temperature sensitive means coupled to said mercury switches adapted to rotate said switches on a substantially horizontal axis in response to temperature changes, each of said switches having a central conductor and a first and a second contact at its opposite ends, means electrically connecting the central conductors of the switches, each of said first contacts being at the forward end of its respective switch in relation to switch rotation upon temperature change in one direction, each of said second contacts being at the forward end of its respective switch in relation to switch rotation upon temperature change in the opposite direction, said mercury switches being inclined with respect to each other in the vertical plane so that one of said switches is more forwardly inclined in the direction corresponding to rotation upon temperature change in one direction while the other of said switches is more forwardly inclined in the direction corresponding to rotation upon temperature change in the opposite direction.

4. Electrical control means comprising measuring means for measuring a variable, a horizontal shaft secured to said measuring means and adapted to be rotated thereby, first and second single-pole, double-throw mercury switches carried by the shaft so as to be tilted about a horizontal axis in response to the effect of a change in said variable upon said rotational measuring means, said mercury switches being inclined with respect to each other in the vertical plane, each of said switches including a central conductor and first and second contacts at its opposite ends, the central conductors of the switches being electrically connected, and a lead connecting the second and the first contacts of the first and second swtches, respectively, whereby the lead is electrically isolated from the first and the second contacts of the first and the second switches for a predetermined range of said variable and is selectively electrically connected to one of the last mentioned contacts depending upon whether the variable is above or below said range.

5. A thermally sensitive, electric switch means comprising a bimetallic spiral strip adapted to be mounted in a protective housing, a horizontal shaft secured to one end of the spiral strip, first and second single-pole, double-throw mercury switches carried by the shaft so as to be tilted about a horizontal axis in response to the effect of temperature on the bimetallic strip, said mercury switches being inclined with respect to each other in the vertical plane, each of said switches including a central conductor and first and second contacts at its opposite ends, with the central conductors of the switches being electrically connected, and a lead connecting the second and the first contacts of the first and second switches, respectively, whereby the lead is electrically isolated from the first and the second contacts of the first and the second switches for a predetermined range of temperature and is selectively electrically connected to one of the last mentioned contacts depending upon whether the temperature is above or below such range of temperature.

6. Control means including first and second mercury switches and rotatable means, each of said mercury switches mounted upon said rotatable means substantially transversely to the longitudinal axis of said rotatable means whereby said mercury switches are adapted to be rotated on a substantially horizontal axis, each of said switches having a central conductor and a first and a second contact at its opposite ends, means electrically connecting the central conductors of the switches, each of said first contacts being at the forward end of its respective switch in relation to switch rotation in one direction, each of said second contacts being at the forward end of its respective switch in relation to switch rotation in the opposite direction, said mercury switches being inclined with respect to each other in the vertical plane so that one of said switches is more forwardly inclined with regard to rotation in one direction while the other of said switches is more forwardly inclined with regard to rotation in the opposite direction.

7. Control means including first and second mercury switches and rotatable means for measuring a variable, each of said mercury switches mounted upon said rotatable means substantially transversely to the longitudinal axis of said rotatable means whereby said mercury switches are adapted to be rotated on a substantially horizontal axis in response to measured changes in said variable, said rotatable measuring means adapted to rotate said switches in one direction in response to a measured increase in said variable and to rotate said switches in the other direction in response to a measured decrease in said variable, each of said switches having a central conductor and a first and a second contact at its opposite ends, means electrically connecting the central conductors of the switches, each of said first contacts being at the forward end of its respective switch in relation to switch rotation in one direction, each of said second contacts being at the forward end of its respective switch in relation to switch rotation in the opposite direction, said mercury switches being inclined with respect to each other in the vertical plane so that one of said switches is more forwardly inclined in the direction corresponding to rotation in one direction while the other of said switches is more forwardly inclined in the direction corresponding to rotation in the opposite direction.

8. Temperature control means including first and second mercury switches and temperature sensitive rotatable means, each of said mercury switches mounted upon said rotatable means substantially transversely to the longitudinal axis of said rotatable means whereby said mercury switches are adapted to be rotated on a substantially horizontal axis in response to temperature changes, each of said switches having a central conductor and a first and a second contact at its opposite ends, means electrically connecting the central conductors of the switches, each of said first contacts being at the forward end of its respective switch in relation to switch rotation upon temperature change in one direction, each of said second contacts being at the forward end of its respective switch in relation to switch rotation upon temperature change in the opposite direction, said mercury switches being inclined with respect to each other in the vertical plane so that one of said switches is more forwardly inclined in the direction corresponding to rotation upon temperature change in one direction while the other of said switches is more forwardly inclined in the direction corresponding to rotation upon temperature change in the opposite direction.

References Cited by the Examiner
UNITED STATES PATENTS

| | | | |
|---|---|---|---|
| 1,674,051 | 6/28 | McCabe | 200—122 |
| 2,043,834 | 6/36 | Marbury | 200—138 |

BERNARD A. GILHEANY, *Primary Examiner.*